July 26, 1949.  J. H. STARK  2,477,352
BRUSH HOLDER
Filed Oct. 18, 1946

Inventor:
Julian H. Stark,
by Browell S. Mack
His Attorney.

Patented July 26, 1949

2,477,352

UNITED STATES PATENT OFFICE 2,477,352

BRUSH HOLDER

Julian H. Stark, Fort Wayne, Ind., assignor to General Electric Company, a corporation of New York Application October 18, 1946, Serial No. 703,963

5 Claims. (Cl. 171—324)

My invention relates to brush holders and particularly to an arrangement in which individual brush holder guide tubes are adapted to be mounted and insulated from a relatively stationary mounting member of electrically conductive material.

An object of my invention is to provide an improved and simplified brush holder.

Another object of my invention is to provide an improved and simplified brush holder mounting construction.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
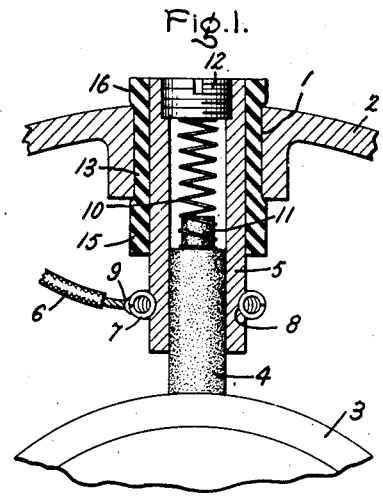
Figure 2:
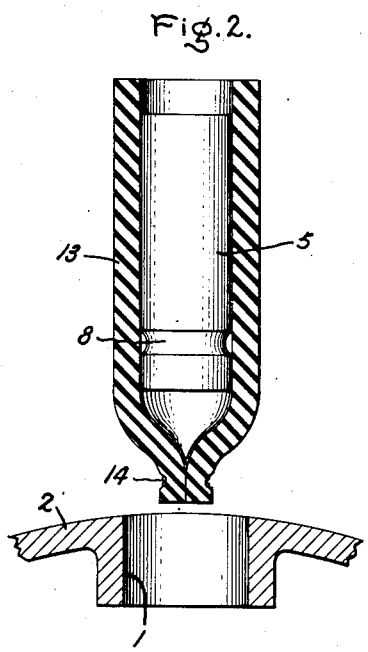
Figure 3:
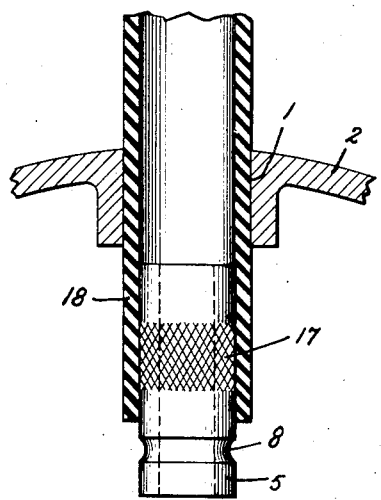

In the drawing, Fig. 1 is a side elevational view, partly in section, of a brush holder provided with an embodiment of my invention; Fig. 2 is an enlarged side elevational view, partly in section, of the arrangement shown in Fig. 1 prior to its complete assembly; Fig. 3 is a side elevational view, partly in section, of another embodiment of my invention illustrating a step in the process of assembling this arrangement; and Fig. 4 is a side elevational view, partly in section, of the completely assembled brush holder shown in Fig. 3.

Referring to the drawing, I have shown in Figs. 1 and 2 an embodiment of my invention in which a brush holder is provided which is adapted to be supported in an opening 1 in an electrically conductive relatively stationary supporting member 2 arranged about a relatively rotatable member having a rotatable current collector 3 to which electric current is adapted to be supplied by a suitable contact brush 4 arranged in the brush holder. In this construction, the brush holder includes a brush guide tube 5 formed of electrically conductive material and having a passage therein extending axially thereof for guiding the contact brush 4 therethrough. Electric current is adapted to be supplied to the brush holder 5 by a suitable lead 6 connected to the brush holder tube 5 by a suitable connector, such as a garter spring 7 arranged around a peripherally extending groove 8 in the outer surface of the brush guide tube 5 and electrically connected at 9 to the lead 6. In this construction, the contact brush 4 is biased towards the current collector 3 by a suitable compression coil spring 10 arranged around a spring seat 11 formed on the contact brush 4 and a cover 12 threadedly secured in the outer end of the brush holder tube 5 for closing the outer end of the brush passage through this tube.

The brush holder guide tube 5 is adapted to be supported in the mounting members 2 and to be insulated therefrom by a resilient insulating material sleeve member 13 which may be formed of rubber or any other similar material having an unstressed inner diameter slightly less than the outer diameter of the brush guide tube 5 and an unstressed outer diameter slightly greater than the inner diameter of the stationary member mounting opening 1. In assembling the unit shown in Figs. 1 and 2, the insulating sleeve preferably is arranged peripherally around the brush guide tube 5, as shown in Fig. 2, and this assembly is held together at one end thereof in any suitable manner, as by a binding 14, and drawn into the brush holder opening 1 in the stationary member 2 until the inner end of the brush guide tube 5 is in its desired position. This is preferably a position which allows a predetermined amount of free brush space between the inner end of the brush guide tube and the current collector 3 and also which provides a predetermined amount of extension of the brush guide tube 5 beyond the outer surface of the stationary mounting member 2 as shown in Fig. 1. When the brush holder guide tube is in the position shown in Fig. 1, the inner end of the insulating sleeve 13 is cut or otherwise removed from the lower or inner end of the brush guide tube 5, leaving a portion 15 of the insulating sleeve 13, as shown in Fig. 1, with the inner end thereof unrestricted on its outer side so that it expands outwardly to a substantially undeformed portion 15 at this end of the insulating sleeve, forming an enlargement which assists in securing the brush guide tube member 5 in position in the mounting member 2. Similarly, the outer end of the sleeve 13 is cut preferably substantially flush with the outer end of the brush guide tube 5, as shown in Fig. 1, which leaves a substantially undeformed portion 16 which assumes its expanded proportion and forms an enlargement at this outer end of the sleeve also assisting in securing the brush guide tube member 5 in position in the mounting member 2. This forms an arrangement in which the insulating sleeve 13 has an intermediate portion which is held under compression and deformation between the brush guide tube 5 and the sides of the mounting opening 1 of the stationary member and forms a good mechanical support for the brush holder tube 5 in the mounting member.

Figure 4:
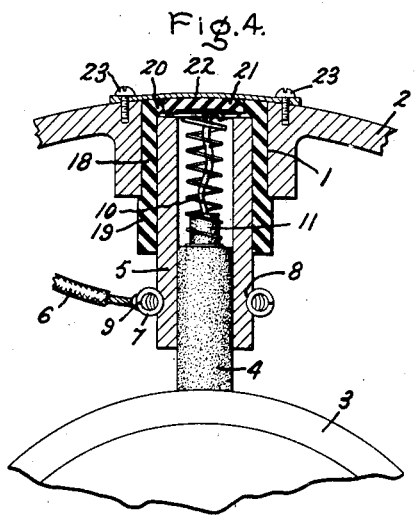

In Figs. 3 and 4, I have shown another embodiment of my invention in which the brush guide tube 5 is formed similar to that in Figs. 1 and 2 and, in addition, preferably also is provided with a roughened surface which may be knurled as shown at 17 intermediate the ends thereof which is adapted to be arranged within an insulating sleeve 18 around this portion of the brush guide tube. In this construction, however, the resilient insulating material sleeve 18 is initially arranged around the brush guide tube 5 so that the inner portion thereof is exposed as shown in Fig. 3 and the insulating sleeve 18 is then pulled outwardly through the mounting opening 1 in the stationary member 2 until the brush guide tube outer edge is almost out of the opening 1, that is, almost out to the outer surface of the mounting member 2. The insulating sleeve then is cut off substantially flush with the outer surface of the mounting member 2, and since this insulating sleeve 18 is of substantially the same dimensions relative to the opening 1 and the brush guide tube 5 as that referred to with respect to Figs. 1 and 2, that is, the dimensions of the inner and outer diameter thereof are less and greater than the respective diameters of the brush guide tube 5 and the mounting opening 1, the portions of the insulating sleeve 18 between the brush guide tube 5 and the sides of the opening 1 are compressed and deformed to a smaller dimension, forming a secure mounting for the brush guide tube in the opening 1. The uncompressed ends of the insulating sleeve 18 at both ends thereof assume an expanded substantially undeformed position, as shown at 19 and 20, one of which is on the inner side of the mounting member opening 1 and the other of which is within this mounting member opening. In this construction, the contact brush 4 is biased towards the current collector 3 by a suitable compression coil spring 10 between a spring seat 11 on the contact brush 4 and an insulating washer 21 secured in position by a cover 22 extending over the outer side of the mounting opening 1 and secured in position in any suitable manner, as by screws 23.

As in the construction shown in Fig. 1, electric current is adapted to be conducted to the brush holder guide tube 5 in any suitable manner, as by a garter spring connector 7 suitably connected to a lead 6 by an electrical connection shown at 9. This also provides a relatively simple brush holder and in some cases may be preferred over the arrangement shown in Fig. 1 in that the insulating material is not exposed to the outer surface of the mounting member 2.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A brush holder adapted to be supported in an opening in a stationary member, said brush holder including a brush guide tube, and means including a resilient insulating material member having an unstressed inner diameter slightly less than the outer diameter of said brush guide tube and an unstressed outer diameter slightly greater than the inner diameter of said stationary member mounting opening arranged peripherally around a portion of said brush guide tube and extending within said stationary member supporting opening between said guide tube and the surrounding adjacent side of said stationary member supporting opening to provide for compression and deformation of said resilient member between said guide tube and the sides of said opening for forming a good mechanical support for the guide tube in said stationary member.

2. A brush holder adapted to be supported in an opening in a stationary member, said brush holder including a brush guide tube having a roughened outer surface intermediate the ends thereof, and means including a resilient insulating material member having an unstressed inner diameter slightly less than the outer diameter of said brush guide tube and an unstressed outer diameter slightly greater than the inner diameter of said stationary member mounting opening arranged peripherally around said roughened surface of said brush guide tube and extending within said stationary member supporting opening between said guide tube and the surrounding adjacent side of said stationary member supporting opening to provide for compression and deformation of said resilient member between said guide tube and the sides of said opening for forming a good mechanical support for the guide tube in said stationary member.

3. A brush holder adapted to be supported in an opening in a stationary member, said brush holder including a brush guide tube, and means including a resilient insulating material member having an unstressed inner diameter slightly less than the outer diameter of said brush guide tube and an unstressed outer diameter slightly greater than the inner diameter of said stationary member mounting opening arranged peripherally around a portion of said brush guide tube and extending within said stationary member supporting opening between said guide tube and the surrounding adjacent side of said stationary member supporting opening to provide for compression and deformation of said resilient member between said guide tube and the sides of said opening for forming a good mechanical support for the guide tube in said stationary member, said resilient material member having a substantially undeformed expanded portion forming enlargements thereof on each side of said stationary member for further assisting in securing said brush guide member in position.

4. A brush holder adapted to be supported in an opening in an electrically conductive stationary member, said brush holder including a brush guide tube having a passage therein extending axially thereof for guiding a contact brush therethrough, means including a cover for closing the outer end of said bearing tube passage, and means including a resilient insulating material member having an unstressed inner diameter slightly less than the outer diameter of said brush guide tube and an unstressed outer diameter slightly greater than the inner diameter of said stationary member mounting opening arranged peripherally around a portion of said brush guide tube and extending within said stationary member supporting opening between said guide tube and the surrounding adjacent sides of said stationary member supporting opening to provide for compression and deformation of said resilient member between said guide tube and the sides of said stationary member supporting opening for forming a good mechanical support for the guide tube in said stationary member, said resilient material member having a substantially undeformed expanded portion at each end thereof adjacent the inner and outer ends of said stationary member supporting opening forming enlargements thereof further assisting in securing said brush guide member in position.

5. A brush holder adapted to be supported in an opening in a stationary member, said brush holder including a brush guide tube having a passage therein extending axially thereof for guiding a contact brush therethrough and extending into said opening with the outer end of said guide tube slightly inside the outer surface of said stationary member, and means including a resilient insulating material member having an unstressed diameter slightly less than the outer diameter of said brush guide tube and an unstressed outer diameter slightly greater than the inner diameter of said stationary member mounting opening arranged peripherally around a portion of said brush guide tube and extending within said stationary member supporting opening between said guide tube and the surrounding adjacent side of said stationary member supporting opening to provide for compression and deformation of said resilient member between said guide tube and the sides of said opening for forming a good mechanical support for said guide tube in said stationary member, said resilient material member having a substantially undeformed expanded portion at each end thereof adjacent the inner and outer ends of said stationary member supporting opening forming enlargements further assisting in securing said brush guide member in position.

JULIAN H. STARK.

REFERENCES CITED

The following references are of record in the file of this patent:

UNITED STATES PATENTS

| Number | Name | Date |
|---|---|---|
| 1,751,462 | Baker | Mar. 25, 1930 |
| 1,793,258 | Smellie et al. | Feb. 17, 1931 |